Patented Apr. 12, 1938

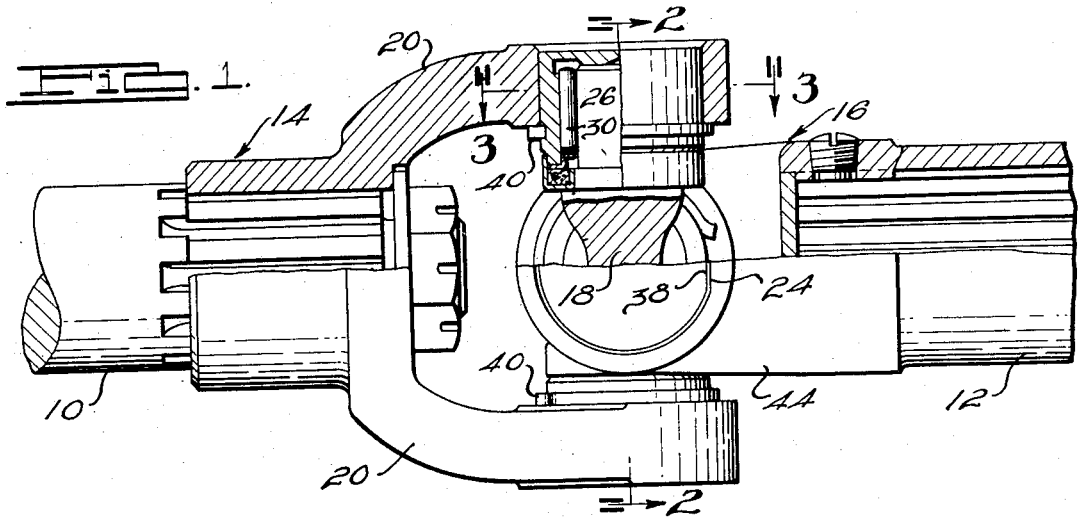
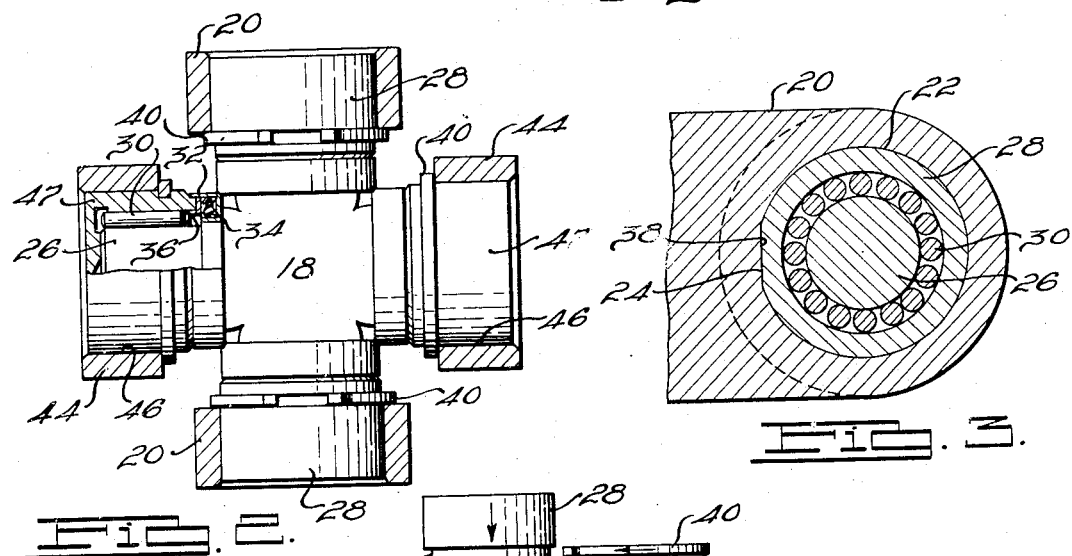
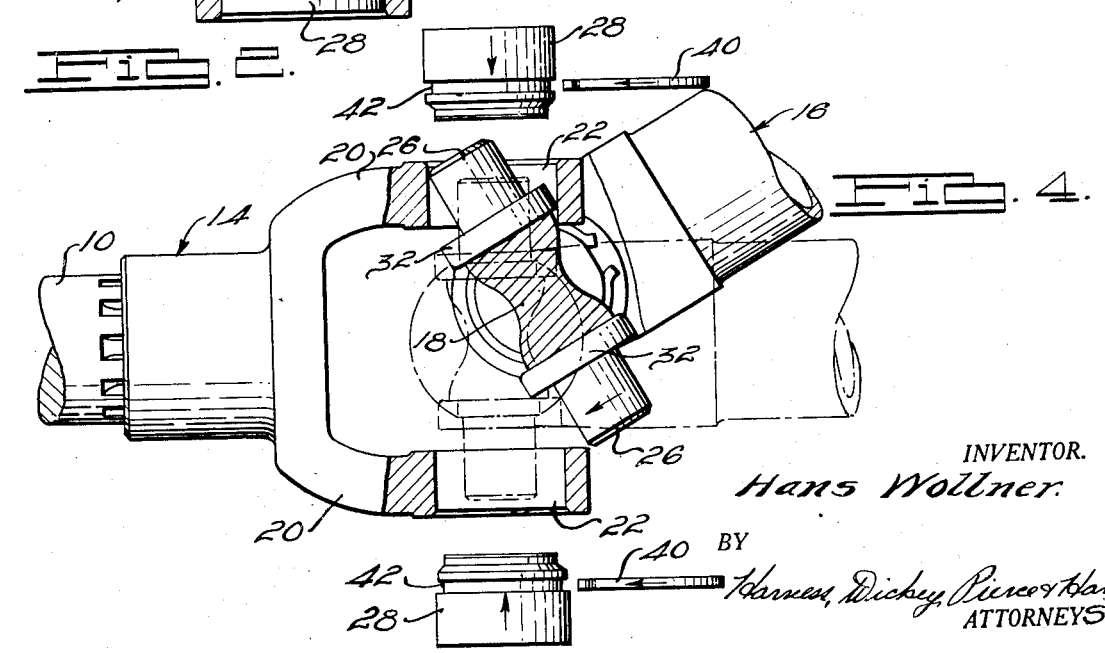

2,114,199

UNITED STATES PATENT OFFICE 2,114,199

TAKE-DOWN JOINT

Hans Wollner, Detroit, Mich., assignor to Universal Products Co., Inc., a corporation of Delaware Application August 29, 1935, Serial No. 38,489

5 Claims. (Cl. 64—17)

The present invention relates to universal joint mechanism and particularly to universal joint mechanism of the demountable or take-down type.

It is an object of the present invention to provide a universal joint comprising a yoke connected to a coupling or cross through a bushing formed to slidably and rotatably fit over a trunnion associated with the coupling, and to slidably but non-rotatably fit into the yoke.

It is a further object of the present invention to provide a bushing of the above mentioned character which may be retained in assembled relation and properly aligned with the yoke by retaining rings which may be snapped into place after assembly of the parts.

It is a further object of the present invention to provide a universal joint in which the above stated bushing or intermediate member comprises a bearing cup formed to receive a needle bearing unit.

It is a further object of the present invention to provide a universal joint embodying a yoke, comprising an enclosed non-circular journal portion, a bushing having its periphery formed to fit non-rotatably within such journal portion, and a cross or coupling member having a trunnion rotatably received within said bushing member.

It is also an object of the present invention to generally simplify and improve the construction of universal joints of the take-down or demountable type.

Other objects and advantages of the present invention appear in the following description and in the appended claims.

In the drawing, throughout the several views of which corresponding reference characters are used to designate corresponding parts:

Figure 1 is a view in elevation, partly in section, of a universal joint embodying the present invention;

Fig. 2 is a view taken along the lines 2—2 of Fig. 1;

Fig. 3 is a view taken along the line 3—3 of Fig. 1; and

Fig. 4 is an exploded view of the structure shown in Fig. 1, illustrating the method of assembling the parts.

In the automobile industry, which provides an illustrative application for the universal joint of the present invention, universal joints of the take-down or demountable type have been generally adopted in forming a connection between the drive shaft or torque tube and the vehicle transmission, because of the reduced assembly cost resulting from their use.

Such joints conventionally include a pair of yokes, one of which is splined to the drive shaft or torque tube, and the other of which is splined to the shaft portion extending from the transmission. Each yoke may comprise a pair of spaced legs formed to provide journals for trunnions formed in radially spaced relation on an intermediate coupling or cross. Customarily, also, a bearing cup, which forms a housing for a needle bearing unit is interposed between the journals and the trunnions.

Preferably, the journals associated with one of the yokes are of the demountable type, that is, such yokes and the coupling may be assembled and disassembled readily in the assembly line. In accordance with this practice, the joint is supplied to the automobile assembly line with one of the yokes in assembled relation with the coupling and the other yoke disassembled therefrom. The initially disassembled yoke is connected to the coupling to complete the joint as a part of the regular assembly line routine. It is essential therefore that the joints be readily assembled and embody as few parts as possible. The joints are subjected to heavy duty, and it is further essential that the rapid assembly produce a rigid and durable unit.

The co-pending applications of the present applicant, Serial Number 21,215, filed May 15, 1935, and Serial Number 31,771, filed July 10, 1935, disclose demountable universal joints which may be assembled in accordance with the above described practice. In accordance with the constructions there disclosed, the demountable yoke is formed with open mouth journal portions, wide enough to permit the bushings or bearing cups to be slipped therein longitudinally of the yoke, and being adapted to be thereafter closed or restricted by external means.

The present invention provides a construction of universal joint which distinguishes from the above constructions principally in that the journal portions of the initially disassembled yoke are enclosed, and the supplemental closing or restricting means are dispensed with. In the illustrated form of the present invention, the journal portions of the disassembled yokes are non-circularly formed, the formation being such as may readily and economically be effected by a broaching operation. A bearing cup, formed to house a conventional needle bearing unit, or other type of intermediate bushing member, is provided to be slipped over the end of each trunnion of the intermediate coupling or cross. The exterior of the bushing or bearing cup is formed to correspond to and readily slide into the non-circular journal openings in the yoke. The bearing cups or bushings are retained in place and aligned in proper relation to the yokes by retaining rings which conveniently snap into annular surface recesses in the bushings or bearing cups.

The relation of the parts is such that in assembly the couplings or cross may be turned at an angle with respect to the yoke and one trunnion inserted into its cooperating journal opening and passed therethrough far enough to be swung to a position in which an opposite trunnion registers with its cooperating journal opening. The coupling may then be centered with respect to the yoke and the bushings or bearing cups fitted thereover and locked in place by means of the retaining rings, which engage the inner edges of the yoke journal portions. As stated the exterior of the bushings or bearing cups correspond to the non-circular formation of the journal openings so that the bearing cups are non-rotatable with respect to the yokes, and all of the rotative movements are effected through the needle bearing connection between the bearing cups and the trunnions.

Referring in detail to the drawing, illustrative shaft sections 10 and 12 are conventionally splined to yokes 14 and 16, which in turn are universally connected together through a central cross or coupling 18.

The yoke 14 is bifurcated and includes the two oppositely disposed leg sections 20, the outer end of each of which is provided with a journal opening 22, which passes therethrough at right angles to the longitudinal axis of yoke 14. As best shown in Fig. 3, each opening 22 is circular throughout a substantial portion of its perimeter, but includes the flattened or cam section 24.

The coupling or cross 18 comprises the four similar radially disposed co-planar trunnions, spaced ninety degrees apart and one of which is designated 26. A bearing cup 28 is provided for each trunnion associated with yoke 14, to house a conventional needle bearing unit. One such unit is shown as comprising the rollers 30. A lubricant tight seal is provided between each bearing cup and its associated trunnion and may comprise a packing ring such as 32, a packing gland such as 34 and a retaining ring such as 36. This construction is conventional and it will be understood that when the parts are in assembled relation the inner edge of each bearing cup is pressed tightly into engagement with the associated retaining ring 36, thereby compressing the packing gland 34 and affording a tight seal.

The exterior of each of the two bearing cups 28 associated with yoke 14 is circular throughout a substantial portion of its perimeter, but includes a flattened portion 38 which corresponds to and is substantially coextensive with the flattened surface 34 formed on the journal opening 22. The dimensions of the parts are such that each of the bearing cups 28 may be freely slid into the associated journal opening. Rotation therein is prevented by the cooperating flattened surfaces 34 and 38.

In assembling yoke 14 with cross 18, and referring particularly to Fig. 4, cross 18 is turned to the position shown in full lines, thus permitting one of the two trunnions 26 associated with yoke 14, previously supplied with a retaining ring 32, to be inserted into and partially through the journal opening 22. At will be understood, the dimensions of the trunnions 26 and journal openings 22 are such that the trunnion 26 may be slipped far enough through opening 22 to allow the opposite trunnion 26 to be swung in a counterclockwise direction into registry with its associated opening 22. Thereafter, the cross 18 may be entered with respect to yoke 14 and the two bearing cups 28, which may previously have been supplied with the needle bearing elements, may be slipped into the journal openings 22 and over the ends of the associated trunnions 26. After bearing cups 28 are fitted in place, locking rings 40 are successively snapped into the annular recesses 42 formed in bearing cups 28. The locking rings 40 are preferably formed of a bent piece of springlike metal, curved into an arc of slightly smaller radius than the radius of the associated recess 42. The free ends of each ring are preferably flared outwardly to assist in the snapping action. In being snapped in place, the rings 40 are sprung slightly and so are securely maintained within the cooperating recesses. As will be evident, the retaining rings 40 serve both to lock the bearing cups 28 in place, and also to properly position these elements with respect to yoke 14.

The remaining yoke 16 may be constructed as described in connection with yoke 14. To simplify the drawing however, the remaining yoke 16 is illustrated as of the conventional type, being provided with the legs 44 in which the circular journal openings 46 are provided. The bearing cups 47 associated with yoke 16 correspond in construction to cups 28 but are circular, and are preferably press fitted into the journal openings 46, so that rotation between yoke 16 and the bearing cups is prevented. Retaining rings 40 are also provided in connection with the bearing cups 47.

Although a specific embodiment of the present invention has been described, it will be evident that various changes may be made in the form and arrangement of parts within the spirit thereof, as defined in the appended claims.

What I claim is:

1. Universal joint mechanism comprising, in combination, a yoke having a pair of spaced legs each having a non-circular journal opening formed therein of uniform size along its length; a coupling having a trunnion individual to each of said journal openings; a bushing individual to each trunnion for rotatably supporting it in the associated journal opening and having a non-circular exterior of uniform size along its length adapted to be slidably but non-rotatably received in the corresponding opening, and a retaining ring individual to each of said bushings for securing it in position axially with respect to the associated legs.

2. Universal joint mechanism comprising, in combination, a yoke having a pair of spaced legs each having a non-circular journal opening formed therein of uniform size along its length; a coupling member having shaft sections individual to each of said journal openings; means comprising a bushing for rotatably supporting each of said shaft sections in the associated journal opening, and having a non-circular exterior of uniform size along its length adapted to be slidably but non-rotatably received in the associated journal opening, and means for axially positioning said bushings with respect to said journal openings.

3. Universal joint mechanism, comprising, in combination, a yoke having a pair of spaced legs each having an inwardly presenting face and each having a non-circular journal opening formed therein of uniform size along its length; a coupling member having a pair of axially parallel trunnions, one individual to each of said journal openings and adapted to be projected into the associated opening in assembling the joint; a cup-like member adapted to be fitted over the end of the associated trunnion after the associated trunnion has been inserted into the associated opening, each cup-like member having an exterior of uniform size along its length and shaped to have a slidable but non-rotative fit in the corresponding opening; and a retaining ring individual to each cup-like member and adapted to be fitted thereover so as to bear against the said face of the associated leg so as to axially position the associated cup-like member.

4. Universal joint mechanism comprising in combination, a first member having a pair of spaced axially aligned non-circular journal openings therein of uniform size along their lengths; a second member having a trunnion individual to each of said openings; a bushing individual to each trunnion for rotatably supporting it in the corresponding opening, each bushing being of uniform size along its length so that it is axially slidable into the associated opening and being non-circular in section so that the surfaces of the bushing and of the opening cooperate to prevent relative rotation therebetween; and means for retaining each bushing and its journal opening in assembled axial relation.

5. Universal joint mechanism comprising in combination, a first member having a pair of spaced axially aligned non-circular journal openings therein of uniform size along their lengths; a second member having a trunnion individual to each of said openings; a bushing individual to each trunnion for rotatably supporting it in the corresponding opening, each bushing being of uniform size along its length so that it is axially slidable into the associated opening and having an external surface which is non-circular and complemental to the surface of the corresponding opening so that the complemental surfaces directly interengage to prevent relative rotation between each opening and its bushing; and means for retaining each bushing and its journal opening in assembled axial relation.

HANS WOLLNER.